United States Patent [19]

Ricard

[11] Patent Number: 4,628,414
[45] Date of Patent: Dec. 9, 1986

[54] METHOD OF MANUFACTURING AND OF ADJUSTING THE ORIENTATION OF A MOTOR VEHICLE HEADLAMP; AND A MOTOR VEHICLE HEADLAMP FOR PERFORMING SAID METHOD

[75] Inventor: Jacques Ricard, Paris, France

[73] Assignee: Cibie Projecteurs, France

[21] Appl. No.: 749,308

[22] Filed: Jun. 27, 1985

[30] Foreign Application Priority Data

Jul. 2, 1984 [FR] France ............................ 84 10465

[51] Int. Cl.$^4$ ..................... B60Q 1/06; F16B 37/00
[52] U.S. Cl. .................................. 362/61; 362/419;
362/289; 362/182; 362/427; 33/180 L; 279/3
[58] Field of Search ................. 362/277, 418, 269, 61,
362/289, 368, 287, 371, 283, 372, 419; 33/180
L; 279/3

[56] References Cited

U.S. PATENT DOCUMENTS 3,047,958  8/1962  Durbin ........................... 33/180 L
3,503,486  3/1970  Makita ............................. 362/61
4,188,655  2/1980  Tallon et al. ...................... 362/421
4,554,617 11/1985  Tyler ............................... 362/418

FOREIGN PATENT DOCUMENTS 0054444   6/1982  European Pat. Off. .
138217    4/1985  European Pat. Off. ............ 362/418
A3320031 12/1983  Fed. Rep. of Germany .
A2319512  2/1977  France .

*Primary Examiner*—James C. Yeung
*Attorney, Agent, or Firm*—McCormick, Paulding & Huber

[57] ABSTRACT

The present invention relates to manufacturing and adjusting the orientation of a motor vehicle headlamp and to a motor vehicle headlamp for performing the method. In a headlamp (7) of the type comprising a transparent front glass (15) fixed to the bodywork (28, 29) of the vehicle and an optical assembly (35, 36) having an optical axis (38) passing through the glass (15), graduated adjustment means (90) are provided for adjusting the orientation of the optical assembly (35, 36) relative to the glass (15) in order to enable the orientation of the optical axis (38) to be adjusted using said means (90) relative to an error as measured between the orientation of the glass (15) as mounted and a predetermined orientation thereof. This makes it possible to use mechanical means for measuring such an error and to adjust the orientation of the optical axis as a result of such measurement providing the headlamp is of the above-described type.

5 Claims, 13 Drawing Figures

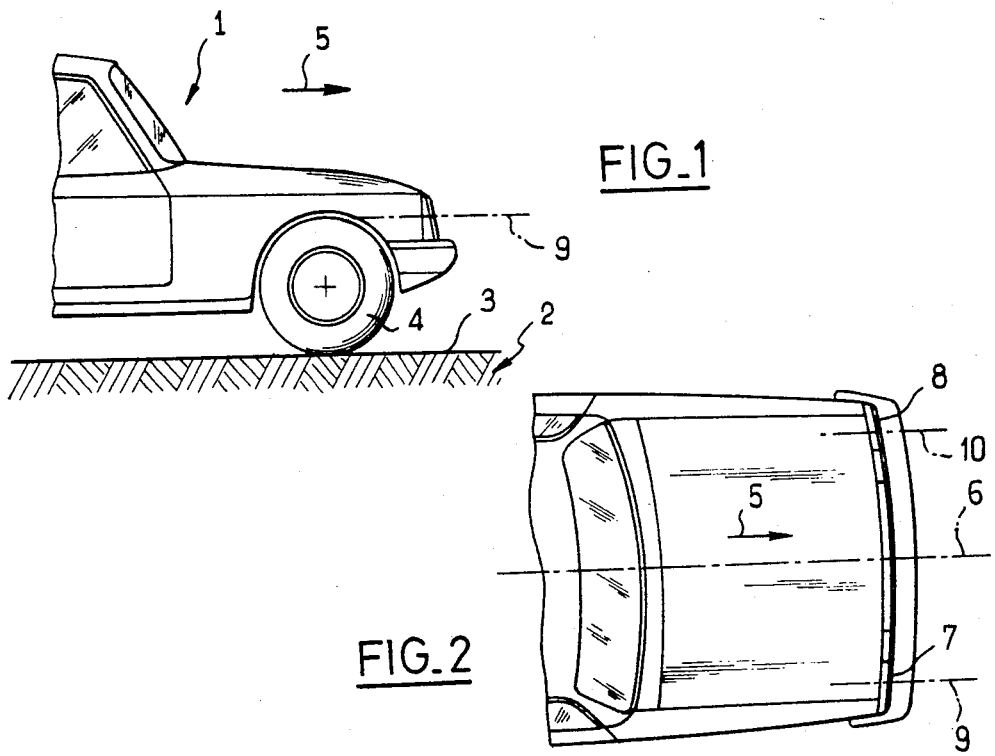
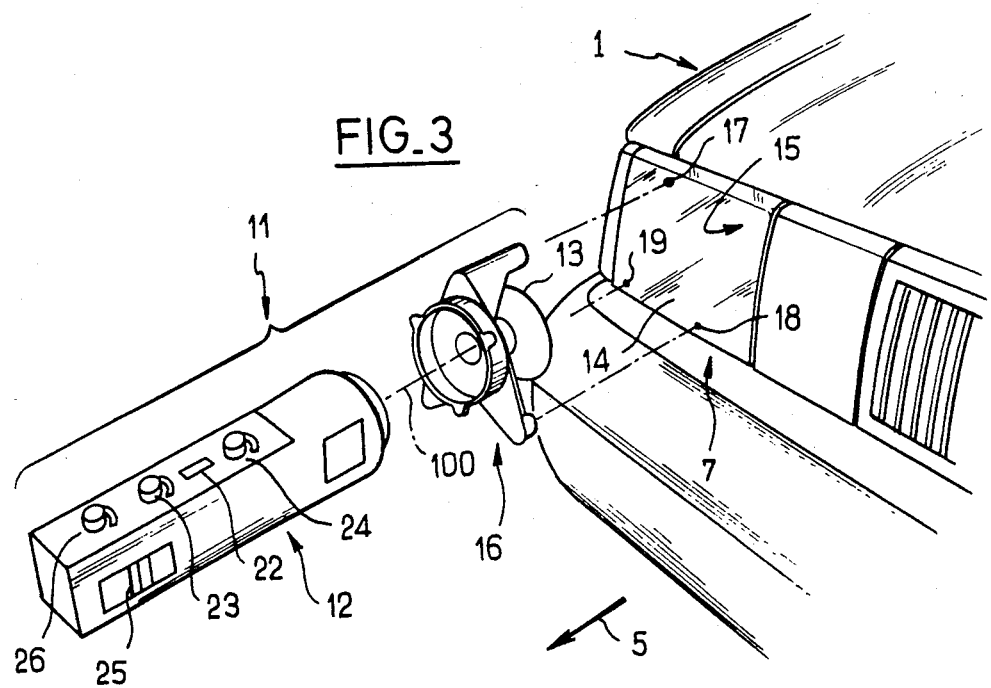

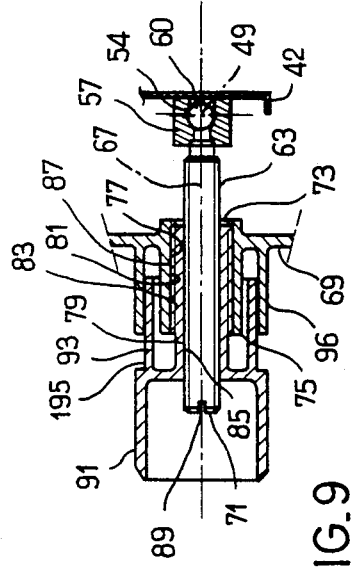
FIG_9
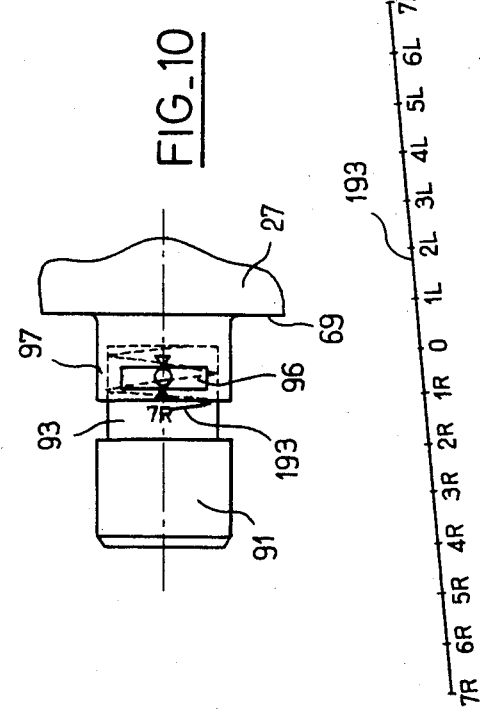
FIG_10
FIG_11
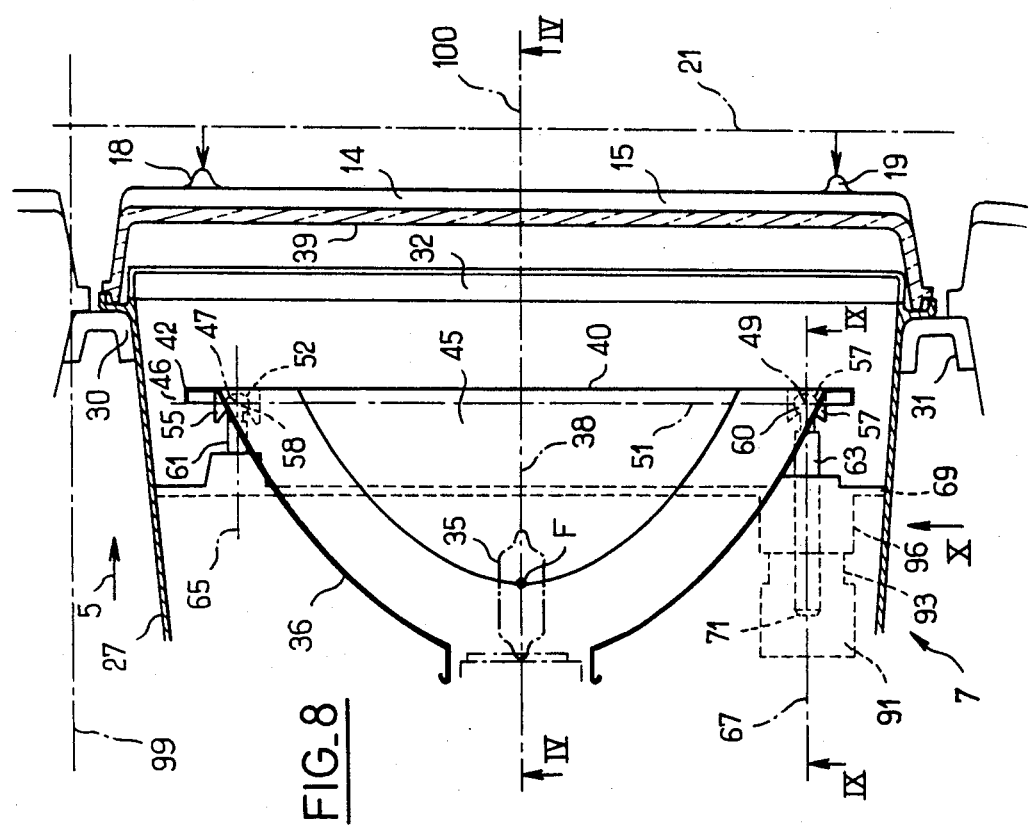
FIG_8

METHOD OF MANUFACTURING AND OF ADJUSTING THE ORIENTATION OF A MOTOR VEHICLE HEADLAMP; AND A MOTOR VEHICLE HEADLAMP FOR PERFORMING SAID METHOD

The present invention relates to a method of manufacturing and of adjusting the orientation of a motor vehicle headlamp, and also to a motor vehicle headlamp for performing said method.

More precisely, the present invention is concerned with manufacturing and adjusting the orientation of headlamps of the type comprising a transparent glass fixed to the bodywork of a vehicle, and an optical assembly having an optical axis which passes through the glass.

BACKGROUND OF THE INVENTION

In order to satisfy statutory standards, the optical assembly in such headlamps must be pivotable relative to the glass to allow the orientation of the optical axis to be adjusted relative to the plane of the ground on which the vehicle stands, i.e. a plane defined by contact between the wheels of the vehicle and the ground, and/or relative to a plane perpendicular to said plane and defining a longitudinal mid plane of the vehicle.

To this end, headlamps of this type are generally made by providing means which connect the optical assembly to the glass by defining two pivot axes, one of which is approximately perpendicular to the longitudinal mid plane of the vehicle, i.e. approximately parallel to the plane of the ground on which the vehicle stands, and the other of which is approximately perpendicular to the plane of the ground on which the vehicle stands, i.e. is approximately parallel to the longitudinal mid plane of the vehicle. Means are also provided for adjusting the position of the optical assembly relative to the glass by pivoting about each of said pivot axes.

Adjusting the orientation of the optical axis relative to the plane of the ground on which the vehicle stands and relative to the longitudinal mid plane of the vehicle may be performed without difficulty after the headlamp has been mounted on the vehicle, i.e. after the glass has been integrated into the vehicle bodywork. However, to do this it is necessary to use an optical method of adjustment consisting in emitting a beam from said headlamp and in projecting said beam in the form of a light spot on a screen which occupies a predetermined position relative to the vehicle. The adjustment of the headlamp orientation can be seen on the screen relative to both of said planes. If the adjustment appears to be wrong, the optical assembly is made to pivot relative to the glass by acting on said adjustment means so that it rotates about one or both of the pivot axes, and this is continued until the light spot formed on the screen by the beam occupies the correct position, indicating that the optical axis of the headlamp is oriented in accordance with the regulations laid down. Throughout the adjustment process, the relative positions of the light spot on the screen and a mark displaying the correct position for the light spot on the screen enable the operator to observe how the adjustment process is proceeding and also indicate which of the adjustment means should next be used to improve the adjustment.

Unfortunately, this type of headlamp is incompatible with "mechanical" adjustment means which detect wrong adjustment of the orientation of a headlamp's optical axis by detecting a possible difference between the orientation of a plane which is fixed relative to the glass and a predetermined orientation, as is applicable to the system described by U.S. standard SAE J602 OCT80 and as described in U.S. Pat. No. 2,997,914, for example. These systems seek to adjust headlamps whose glass and optical assembly are directly fixed together such that orientation of a plane fixed to the glass is representative of the orientation of the optical axis. In other words, the orientation of such a plane which is fixed relative to the glass is not necessarily representative of the orientation of the optical axis associated therewith in headlamps of the type to which the present invention is applicable.

Preferred embodiments of the present invention enable mechanical means to be used for adjusting the orientation of the optical axis of a headlamp optical assembly when the headlamp glass is fixed to the vehicle bodywork, e.g. as required by the above-mentioned U.S. standard and U.S. patent.

SUMMARY OF THE INVENTION

The present invention provides a method of manufacturing and of adjusting the orientation of a motor vehicle headlamp of the type comprising a transparent glass fixed to bodywork of said vehicle, and an optical assembly having an optical axis passing through said glass, wherein the following steps are performed to place said optical axis in a first predetermined orientation relative to a plane which is fixed relative to said vehicle, for example in an orientation which is parallel to the plane of the ground on which the vehicle stands, or parallel to the longitudinal mid plane of the vehicle;

(1) providing a headlamp further comprising:

means defining a plane which is fixed relative to said glass and which is intended, when said glass is fixedly mounted to said bodywork, to occupy an orientation which at least approximately coincides with a second predetermined orientation relative to said plane which is fixed relative to said vehicle; and connection means for connecting said optical assembly to said glass, said connection means comprising both guide pivot means for guiding said optical assembly to pivot relative to said glass about a pivot axis which is intended, when mounted, to be at least approximately parallel to said plane which is fixed relative to said vehicle, and graduated adjustment means for adjusting the position of said optical assembly relative to said glass by pivoting about said pivot axis;

(2) associating a reference plane with said headlamp, said reference plane being fixed relative to said glass in such a manner that said plane which is fixed relative to said glass occupies said second predetermined orientation relative to said reference plane and that said pivot axis is at least approximately parallel to said reference plane, then acting on said graduated adjustment means to pivot said optical assembly relative to said glass about said pivot axis until said optical axis occupies said first predetermined orientation relative to said reference plane, and setting the graduations of said graduated adjustment means to have an origin corresponding to said relative position, and to indicate the angular orientation of said optical axis relative to said reference plane and from said origin; and mounting said headlamp on said vehicle and fixing said glass to said vehicle bodywork in such a mannner that said plane which is fixed relative to said glass, when mounted, is oriented relative to said plane which is fixed relative to said vehicle as closely as possible to said second predetermined orientation; and (3) measuring such angular offset as there may be between the mounted orientation and said second predetermined orientation, and, if said offset exceeds allowable tolerances, pivoting said optical axis through an angle as marked by said graduations equal to said measured offset and in such a direction as to bring said optical axis into said first predetermined orientation.

In order to perform this method, the present invention also provides a motor vehicle headlamp comprising:

a transparent glass;

means defining a plane which is fixed relative to said glass;

an optical assembly having an optical axis passing through said glass;

connection means for connecting said optical assembly to said glass, said connection means comprising both guide pivot means for guiding said optical assembly to pivot relative to said glass about a pivot axis, and graduated adjustment means for adjusting the position of said optical assembly relative to said glass by pivoting about said pivot axis, with reference to a reference plane at a predetermined orientation relative to the plane which is fixed relative to the glass and at least approximately parallel to said pivot axis.

Advantageously, the means defining a plane which is fixed relative to the glass comprise three tabs which are fixed to the glass and opposite to a reflector of the optical assembly, in a triangle disposition which is preferably in accordance with the disposition laid down by SAE standards enabling the above-mentioned standardized mechanical adjustment means from step (3) onwards.

Checking the orientation of the optical axis relative to the reference plane while performing step (2) of the method in accordance with the invention is advantageously performed with optical means, e.g. in accordance with standard SAE J599 MAY81, either once the headlamp has already been mounted on the vehicle by fixing the glass to the vehicle bodywork, or else, and preferably, in the workshop at the end of headlamp manufacture. This preadjustment step serves to establish a known one-to-one relationship between any offset which may occur after assembly on the vehicle between the plane which is fixed relative to the glass and the second predetermined orientation referred to a plane fixed to the vehicle (e.g. because of mounting inaccuracies which are difficult to avoid or because of unusual vehicle loading, or because of ageing vehicle suspension), and the correction to the orientation of the optical axis which needs to be applied as a function of said offset, together with direct quantification of said correction on the graduated adjustment means, in spite of the optical assembly being pivotably mounted relative to the glass. Naturally, although the purpose of the invention is to enable mechanical adjustment means as defined above to be used once the headlamp has been mounted on a vehicle, it is nevertheless still possible to use optical adjustment means in the conventional manner, i.e. by directly observing the position of spot on a screen relative to the correct standardized position and then adjusting the orientation of the headlamp until the spot occupies said correct position. When performing such optical adjustments, the graduations of the graduated adjustment means may be ignored.

It should be observed that the invention is not limited to the case where only one pivot axis is provided for pivoting the optical assembly relative to the glass.

The present invention thus also provides a method of manufacturing and of adjusting the orientation of a motor vehicle headlamp of the type comprising a transparent glass fixed to the bodywork of said vehicle, and an optical assembly having an optical axis passing through said glass, wherein the following steps are performed to place said optical axis in a first predetermined orientation relative to a first plane and in a second predetermined orientation relative to a second plane, said first and second planes being fixed to said vehicle and being at least approximately perpendicular to each other, e.g. in order to place said optical axis in an orientation which is parallel to the plane of the ground on which the vehicle stands and to the longitudinal mid plane of the vehicle;

(1) providing a headlamp further comprising:

means defining a plane which is fixed relative to said glass and which is intended, when said glass is fixedly mounted to said bodywork, to occupy an orientation which at least approximately coincides with a third predetermined orientation relative to said first plane which is fixed relative to said vehicle and with a fourth predetermined orientation relative to said second plane which is fixed relatively to said vehicle; and connection means for connecting said optical assembly to said glass, said connection means comprising: guide pivot means for guiding said optical assembly to pivot relative to said glass about a first pivot axis which is intended, when mounted, to be at least approximately perpendicular to said second plane which is fixed to said vehicle and about a second pivot axis which is intended, when mounted, to be at least approximately perpendicular to said first plane which is fixed to said vehicle; first graduated adjustment means for adjusting the position of said optical assembly relative to said glass by pivoting about said first pivot axis; and second graduated adjustment means for adjusting the position of said optical assembly relative to said glass by pivoting about said second pivot axis;

(2) associating first and second mutually perpendicular reference planes with said headlamp, said reference planes being fixed relative to said glass in such a manner that said plane which is fixed relative to said glass occupies said third and fourth predetermined orientations relative to said first and second reference planes respectively and that said first and second pivot axes are at least approximately perpendicular to said second and first reference planes respectively, then acting on said first and second graduated adjustment means to pivot said optical assembly relative to said glass about said first and second pivot axes respectively until said optical axis occupies said first and second reference planes, and setting the graduation of said first and second graduated adjustment means to have their origins corresponding to said relative position, and to indicate the angular orientations of said optical axis relative to said first and second reference planes and from said origin; and mounting said headlamp on said vehicle and fixing said glass to said vehicle bodywork in such a manner that said plane which is fixed relative to said glass, when mounted, is oriented relative to said first and second planes which are fixed relative to said vehicle as closely as possible to said third and fourth predetermined orientations; and (3) measuring such first and second angular offsets as there may be between the mounted orientation and said third and fourth predetermined orientations respectively, and, if either of said first and second offsets exceeds allowable tolerances, pivoting said optical axis through an angle as marked by said graduations equal to said measured offset(s) and in such a direction as to bring said optical axis into said first and second predetermined orientations.

To this end, the present invention also provides a motor vehicle headlamp comprising:

a transparent glass;

means defining a plane which is fixed relative to said glass;

an optical assembly having an optical axis passing through said glass;

connection means for connecting said optical assembly to said glass, said connection means comprising both guide pivot means for guiding said optical assembly to pivot relative to said glass about first and second pivot axes which are at least approximately mutually perpendicular, and first and second graduated adjustment means for adjusting the position of said optical assembly relative to said glass by pivoting about said first and second pivot axes respectively, with reference to respective first and second reference planes which are at least approximately mutually perpendicular, relative to which said plane fixed relative to said glass has respective determined orientations, and relative to which:

said first and second pivot axes respectively are at least approximately parallel; and said second and first pivot axes respectively are at least approximately perpendicular.

Advantageously, in this case also, the means defining a plane which is fixed relative to the glass comprise three tabs which are fixed to the glass and opposite to a reflector of the optical assembly, said tabs being disposed in a triangular configuration which is advantageously as defined above in order to enable the optical axis of the headlamp to be adjusted after mounting in the vehicle using the mechanical adjustment means provided for by the above-mentioned American standards.

It may be observed that the present invention is equally applicable to the various different kinds of optical assembly conventionally used in vehicle headlamps. In other words, with reference to the present state of the art, the optical assembly may be a reflector which is at least partially paraboloidal in shape about said optical axis and having the filament of an incandescent lamp located substantially at its focus, or else the lamp may include an ellipsoidal reflector which is symmetrical about the optical axis and which has two focuses, with the focus nearest to the end of the reflector being substantially occupied by the filament of an incandescent lamp, and with the further focus disposed to coincide with the focus of a converging lens. Such optical assemblies are well known per se as are various subsidiary arrangements which they may include for correcting geometrical and/or chromatic aberrations or for giving a desired geometrical shape to the beam emitted by the headlamp. Specific shapes are also known for the glass to enable the glass to perform a complementary optical role in conjunction with a paraboloidal reflector, and also so that modifying the relative position of the reflector and the glass while adjusting the orientation of the optical axis does not deform the outlet beam so much that it ceases to be within the limits laid down (given that such adjustment only requires small changes in angle). It is also known, that if the reflector is elliptical in shape, the glass has no optical role to perform and may be in the form of a sheet having parallel faces which have practically no effect on the shape of the beam when the relative position of the reflector and the glass is varied within the limits expected for adjusting the orientation of the optical axis of a headlamp.

BRIEF DESCRIPTION OF THE DRAWINGS

Embodiments of the invention are described by way of example with reference to the accompanying drawings, in which:

FIGS. 1 and 2 are a side view and a plan view of the front end of a motor vehicle;

FIG. 3 is a perspective view showing a corner of a motor vehicle together with a portion of mechanical means for adjusting the orientation of a headlamp in said corner, said mechanical means being of the type described in American standard SAE J602 OCT80 and, for example, in U.S. Pat. No. 2,997,914;

FIG. 8 is a substantially horizontal section through the FIG. 4 headlamp which is perpendicular to the plane IV—IV and marked VIII—VIII in FIG. 4;

FIG. 9 is a section on a plane marked IX—IX in FIG. 8 through means for adjusting the side-to-side orientation of the headlamp beam, i.e. for adjusting the angular orientation of the optical axis relative to the longitudinal mid plane of the vehicle;

FIG. 10 is a view of the FIG. 9 adjustment means seen in the direction of arrow X in FIG. 8;

FIG. 11 is a flat developed view of the graduations on the FIG. 9 adjustment means.

MORE DETAILED DESCRIPTION

Figure 4:
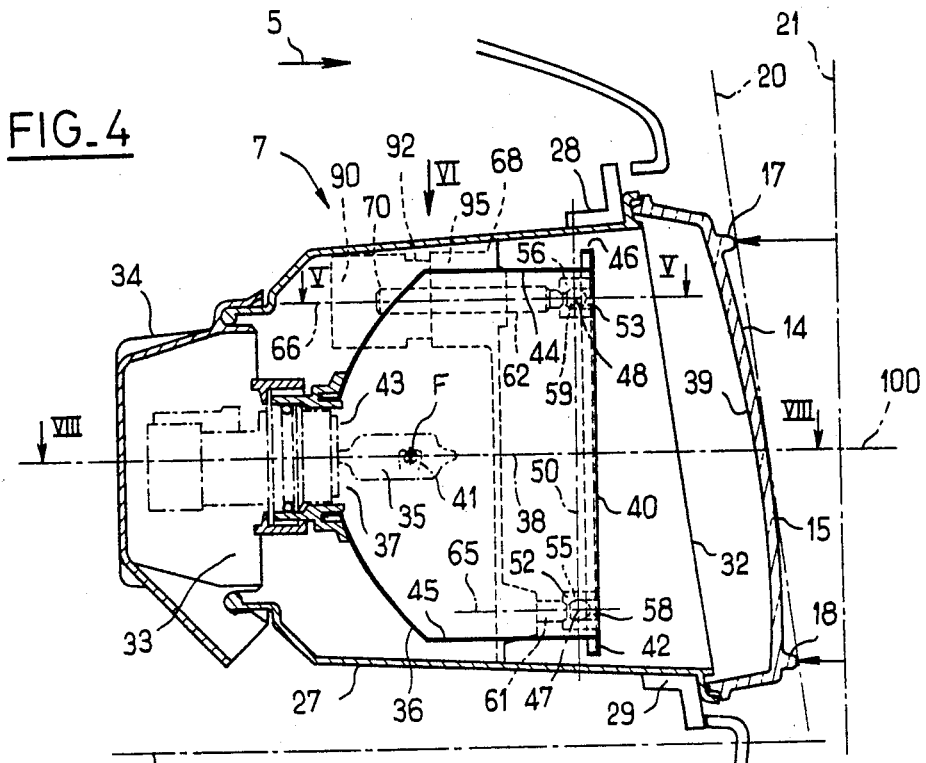
FIG. 4 is a vertical section through a headlamp having a parabolic reflector and mounted in a motor vehicle, the section plane includes the optical axis of the reflector and is designated by references IV—IV in FIG. 8.

Reference is made initially to FIGS. 1 to 3 where 1 designates a motor vehicle having wheels 4 resting on ground 2 which is approximately plane, with the contact points between the wheels 4 and the ground 2 defining the plane 3 of the ground on which the vehicle stands, which plane is approximately horizontal. Arrow 5 indicates the direction of forward movement of the vehicle and 6 designates the longitudinal mid plane of the vehicle 1, which plane is approximately vertical and is defined as being perpendicular to the plane 3 of the ground on which the vehicle stands and parallel to the direction of vehicle movement 5. The vehicle 1 has headlamps 7 and 8 which are symmetrically disposed on either side of the longitudinal mid plane 6, and each of which is intended to emit a light beam having determined orientation referenced 9 and 10 respectively. Official standards, such as U.S. standard SAE J599 MAY81 define these orientations 9 and 10 relative to the plane 3 of the ground on which the vehicle stands and relative to the longitudinal mid plane 6 of the vehicle. In the specific case of this standard, which is used herein by way of non-limiting example of such standards in the following description of how to perform the method of the invention, the orientations 9 and 10 should be parallel to both planes 3 and 6, and may diverge from such parallelism only within strictly determined tolerances which may be determined either optically in accordance with U.S. standards SAE J599 MAY81 or by SAE J600 MAY81, or by mechanical means as defined by U.S. standard SAE J602 OCT80, as described by U.S. Pat. No. 2,997,914, for example. Such means are shown diagrammatically at 11 in FIG. 3, which shows only the headlamp 7 situated to the right of the longitudinal mid plane 6 of the vehicle (with respect to the forward direction of movement 5) and it must be understood that similar means are used to adjust the orientation 10 of the left-hand headlamp 8.

These mechanical means 11 for adjusting the orientation of a headlamp are not described in detail, and for greater details the reader is referred to the above-mentioned U.S. standard.

It is merely recalled that such mechanical means 11 comprise an aiming apparatus 12 suitable for being removably fixed by means of a suction cup 13 on the outwardly directed face 14 of a transparent glass 15 enclosing the headlamp, e.g. the lamp 7 in the present case. The aiming apparatus 12 is positioned relative to the face 14 of the glass 15 in a manner which is accurate and reproducible from one adjustment operation to the next by means of a fitting plate 16 which is fixed to the aiming apparatus 12 in a determined relative position and which bears rearwardly (relative to the direction or forward motion 5) on three hollow housings disposed in a triangular pattern (not shown) on three tabs or thickenings 17, 18 and 19 which are fixed to the glass 15 and which project relative to its face 14 in such a manner as to define a bearing plane 20 for the fitting plate 16 on the tabs 17, 18 and 19. The bearing plane 20 is in fixed relationship to the glass 15 and by urging the fixing plate 16 against the glass 15 using said plane 20 it is possible to establish a one-to-one relationship between said plane 20 and a plane 21 which is in fixed relationship to the fixing plate 16. The one-to-one relationship between these planes relates both to their orientations relative to the plane 3 of the ground on which the vehicle stands and their orientations relative to the longitudinal mid plane 6 of the vehicle. The plane 21 defines an aiming plane for the aiming apparatus 12 thereby enabling the apparatus 12 to check any possible offset between the actual orientation and an orientation which is exactly perpendicular to the plane 3 of the ground on which the vehicle stands in the manner defined by standard SAE J602 OCT80. It also enables the aiming apparatus, in co-operation with similar means 11 associated in like manner with the other headlamp 8 of the vehicle, to check possible offsets of the headlamp orientation relative to an orientation perpendicular to the longitudinal mid plane 6 of the vehicle, by proceeding in the manner described, for example, in the above-mentioned U.S. patent. To this end, the aiming apparatus 12 includes a liquid level 22, means for adjusting said level as a function of the orientation of the plane 3 of the ground on which the vehicle stands relative to the horizontal so as to make the water level 22 a reference for parallelism with the plane 3 of the ground on which the vehicle stands, means 24 linked to the fluid level 22 to measure a possible angular offset between the aiming plane 21 and an orientation which is exactly perpendicular to the plane 3 of the ground on which the vehicle stands, alignment means 25 for alignment perpendicularly to the longitudinal mid plane 6 of the vehicle with similar means on an aiming apparatus analogous to the apparatus 12 but associated with the other headlamp 8 of the vehicle, and means 26 associated with said means 25 to measure any possible angular offset between the aiming plane 21 and an orientation which is exactly perpendicular to the longitudinal mid plane 6 of the vehicle. The person skilled in the art will understand that when the aiming plane 21 is strictly perpendicular relative to the plane 3 of the ground on which the vehicle stands and relative to the longitudinal mid plane 6 of the vehicle, the plane 20 is in a completely determined orientation relative to said planes 3 and 4, and that any offset between the orientation or the aiming plane 21 and strict perpendicularity relative to one or other of the planes 3 and 6 is representative of the angular offset of the plane 20 relative to said predetermined orientation thereof relative to the planes 3 and 6.

For further information concerning the means 11 and how to use them, reference should be made to the above-mentioned standards, together with other standards which may appear on this subject.

Reference is now made to FIGS. 4 to 11, which refer to a first, non-limiting embodiment of the present invention as applied to the headlamp 7 which is taken to be mounted on a vehicle. The headlamp 8 is not described, but its structure may be deduced from that of the following description of the headlamp 7, since the headlamps are at least approximately symmetrical to about the longitudinal mid plane 6 of the vehicle.

We begin by referring to FIGS. 4 and 8 which show that the headlamp 7 comprises a rigid opaque housing 27 for fixing in rigid manner to parts such as 28, 29, 30 and 31 of the vehicle bodywork, thereby causing the headlamp housing 27 to be rigidly integrated into the vehicle bodywork. At the forward end (as defined by arrow 5) the housing 27 has an open face 32 which is closed by the glass 15 which is rigidly fixed around its periphery to the housing 27 in a manner known per se. The face 14 of the glass 15 is thus placed outside the housing 27, and the glass has an inside face 39 looking into the housing. Going backwards, the housing 27 has an opening 33 which is partially closed by a cap 24 for enabling electricity supply conductors to be inserted into the housing 27 together with an incandescent lamp 35 which is lodged inside the housing 27 and which is carried in a fixed but interchangeable manner by means 37 known to the person skilled in the art and serving to hold the filament of the lamp on the optical axis 38 of a reflector 36. The housing 27 holds the reflector 36 therein by means described below which enable the reflector to be moved and to be fixed relative to the housing 27 together with the lamp 35 so as to enable the orientation of the optical axis 38 to be adjusted, and in particular relative to the planes 3 and 6. In this embodiment of the invention, the reflector 36 is partially in the form of a paraboloid of revolution about the axis 38 having a focus F situated on the optical axis 38 with the filament 41 of the lamp 35 being located at the focus F and in the immediate vicinity thereof. The optical axis 38 passes through the face 39 of the glass 15. The glass 15 is disposed opposite the concave side of the reflector 36, and the reflector 36 has an open face 40 for emitting light towards said glass. The face 40 is surrounded by a rim 42 which projects outwardly away from the optical axis 38. A gap 46 is left between said rim 42 and the housing 27 round all sides of the housing so as to enable the orientation of the optical axis to be adjusted in the manner described below. Where the paraboloid intersects the optical axis 38, the reflector 36 has an orifice 43 which receives the means 37 for releasably holding the lamp 35. Between the orifice 43 and the light emitting face 40, the reflector 36 may be entirely paraboloidal in shape and symmetrical about the axis 38 in a manner which is known per se and not shown. Alternatively in a manner which is also known per se and which is shown, it may follow a paraboloidal shape between the orifice 43 and the face 40, which paraboloidal shape is symmetrical about the axis 38 except insofar as it is cut by two parallel planes which are parallel to the axis 38 and which define a reflector 36 two flats 44 and 45 for placing above and below the optical axis 38. These flats should be placed at least approximately horizontally when the headlamp 7 is mounted on a motor vehicle. Such a structure is widely used in motor vehicle headlamps, and the person skilled in the art is thus familiar with the details thereof, which are not described further herein.

The present description relates only to the details of the link between the reflector 36 and the housing 27 in order to enable the optical axis 38 to be placed in an orientation which is determined both relative to the plane 3 of the ground on which the vehicle stands and relative to the longutidinal mid plane 6 of the vehicle, and in particular to enable the optical axis to be placed in an orientation which is parallel to both of said planes when the headlamp is mounted on a motor vehicle.

To this end, in the example shown, the reflector 36 is articulated to the housing 27 by three ball-and-socket joints 47, 48 and 49 which are all fixed relative to the reflector 36, with the first joint 47 being fixed relative to the housing 27 while the other two joints are movable relative thereto.

More precisely, the joints 47, 48 and 49 are situated in a common plane perpendicular to the axis 38 and connected to the reflector 36, and in said plane they define a right-angled triangle with the joint 47 which is fixed relative to the housing 27 being located at the right angle therein. When the headlamp is mounted on a vehicle, the two joints 47 and 48 are disposed along a line 50 which is at least approximately parallel to the longitudinal mid plane 6 of the vehicle and at least approximately perpendicular to the plane 3 of the ground on which the vehicle stands, on the same side of the optical axis 38 as the longitudinal mid plane 6 of the vehicle, whereas the two joints 47 and 49 are disposed along a line 51 which is situated beneath the optical axis 38 and is at least approximately parallel to the plane 3 of the ground on which the vehicle stands and at least approximately perpendicular to the longitudinal mid plane 6 of the vehicle, with the joints 49 and 48 being diametrically opposed relative to the axis 38.

The three joints 47, 48 and 49 are defined on the reflector 36 by three spherical sockets 52, 53 and 54 which are located in three respective lugs 55, 56 and 57 fixed to the back of the rim 42 and around the outside of the reflector 36, i.e. between the reflector 36 and the housing 27. The terms backwards and forwards are used with respect to the direction of forward motion 5 of a vehicle fitted with the headlamp.

Each of these spherical sockets 55, 56 and 57 receives a complementary spherical ball 58, 59 and 60 at the front end of a corresponding rod 61, 62 or 63 having a respective axis 65, 66 or 67 which is at least approximately parallel to the plane 3 of the ground on which the vehicle stands and the longitudinal mid plane 6 of the vehicle. The rod penetrates into the corresponding socket 52, 53 or 54 via an opening which is provided in the rear face of the lugs. In conventional manner, the diameter of the opening is less than the diameter of the ball, and the rod has a neck immediately behind the ball which is likewise of smaller diameter than the ball diameter. This conventional arrangement ensures that each rod is securely retained by the corresponding socket. Adequate clearances are provided in all the necessary places to leave each rod free to move throughout a given solid angle based on the geometrical center of the corresponding ball, and in particular to allow each rod to swing radially relative to the axis thereof.

The rear end of each of the rods 61, 62 and 63 is fixed to the housing 27 by suitable means. The rear end of the rod 61 which corresponds to the joint 47 is rigidly fixed to the housing. However, the rear end of the rod 62 (see FIG. 5) and the rear end of the rod 63 (see FIG. 9) associated with the joints 48 and 49 respectively pass through respective wall portions 68 and 69 of the housing 27 and leave respective externally threaded rear end portions 78 and 79 respectively projecting beyond said wall portions.

The wall portions 68 and 69 have respective orifices 72 and 73 with respective rims 74 and 75 projecting therefrom to the outside of the housing 27. The rims have respective inside cylindrical faces 76 and 77 around the respective rod axes 66 and 67 and tapped at 80 and 81. It should be observed that the tapped portions are not in direct contact with the threaded portions of the corresponding rods.

Each tapped hole 80, 81 has a larger minimum diameter about the corresponding axis 66, 67 than the maximum outside diameter of the thread 78, 79 on the corresponding rod 62, 63. Between each tapped hole 80, 81 and the thread 78, 79 on the corresponding rod 62, 63 there is a corresponding sleeve 82, 83 having internal tapping 84, 85 to mesh with the outside thread 78, 79 of the corresponding rod 62, 63 and also having an external thread 86, 87 which meshes with the tapping 80, 81 in the rim 74, 75 of the corresponding wall portion 68, 69 with which the sleeve 82, 83 is engaged. It should be observed that such an assembly ensures that the axes 66, 67 are fixed relative to the housing 27 and enables the joints 48, 49 to be moved along the axes 66 and 67 respectively by screwing the rod 62 inside the sleeve 82 which may itself be screwed inside the rim 74 or alternatively by screwing the rod 63 inside the sleeve 83 which may itself be screwed inside the rim 75. It may also be observed that such screwing or unscewing of these members also has the effect of moving the joints 47, 48 and 49 closer together or further apart from one another, but that such relative displacements of said joints are of negligible amplitude and easily absorbed by the elasticity which is inevitable with such a mounting.

In order to enable such screwing and unscrewing operations to be performed from the outside of the housing 27, the rear ends 70 and 71 of the rods 62 and 63 have respective slots 88 and 89 for receiving a screwdriver blade (not shown), and each sleeve 82, 83 extends rearwardly outside the housing 27 in the form of a manually graspable drum or knob 90, 91. These knobs are generally cylindrical about the corresponding axis 66, 67 and the rear end 70, 71 of the corresponding rod 62, 63 is located inside the knob. The knobs are opened at their rear ends in order to provide free access to the screwdriver-receiving slots.

Each of the knobs 90, 91 extends forwardly in the form of a cylindrical skirt 92, 93 which surrounds the corresponding rim 74, 75 to which the sleeve is screwed, but which does not come into contact therewith. The skirt does not come into contact with the adjacent wall portion 68, 69 of the housing 27. The outer cylindrical surface 194, 195 of each of said skirts has a graduated scale 192, 193 marked thereon (see FIGS. 6 and 10, with the scales being shown in developed form in FIGS. 7 and 11 respectively). The scales 192 and 193 are disposed helically round the respective skirts at a pitch and in a direction which corresponds to the pitch and direction of the screw engagements between the tapping 80 and the thread 86 or the tapping 81 and the thread 87, as the case may be.

When the knob 90 or 91 is rotated about its axis relative to the housing 27, thereby screwing or unscrewing the corresponding sleeve 82 or 83 into or out from the corresponding rim 74 or 75, the associated graduated scale 192 or 193 moves past a mark which is fixed relative to the housing 27. In the illustrated examples, this mark comprises a second rim 95 surrounding the skirt 92 and having a window 94 for observing a portion of the scale 192, together with an index mark adjacent to the window. An entirely similar arrangement comprising a second rim 97 disposed around the skirt 93 and having a window 96 for observing the graduated scale 193 is provided in association with the other knob 91.

Figure 7:
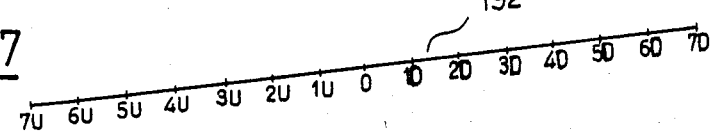
FIG. 7 is a flat developed view of the graduations marked on the FIG. 5 means.

The assembly comprising the reflector 36 and the lamp 35, and thus the optical axis 38 is rotatable about an axis constituted by the line 51 passing through the center points of joints 47 and 49 by operating either of the screw systems disposed about the axis 66. This has the effect of adjusting the up and down orientation of the axis 38, i.e. of adjusting the orientation of the optical axis relative to the plane 3 of the ground on which the vehicle stands. This may be done by rotating either the knob 90 or else the rear end 70 of the rod 62. Thus, as can be seen in FIG. 7, the graduated scale 92 has a central origin mark 0 with marks 1U, 2U, . . . 7U on one side thereof and marks 1D, 2D, . . . 7D on the other side thereof corresponding to pointing the beam further up or further down respectively. In other words, turning the knob 90 so that the U graduations appear in the window 94 causes the optical axis 38 to intersect the face 39 of the glass 15 at successively higher points, and conversely turning the knob the other way so that the D graduations appear in the window causes the optical axis to move further and further down relative to the glass 15.

Similarly, the assembly comprising the reflector 36 and the lamp 35, and hence the optical axis 38 may also be rotated about a line 50 defined by the center points of joints 47 and 48 by rotating either of the screw systems disposed about the axis 67. This has the effect of swinging the optical axis from side to side relative to the longitudinal mid plan 6 of the vehicle. Thus, as can be seen in FIG. 11, the graduated scale 93 has a central origin mark 0 with marks 1R, 2R, . . . 7R on one side thereof and marks 1L, 2L, . . . 7L on the other side thereof, which marks appear in the window 96 when the knob 91 is turned to swing the optical axis 38 to the right or to the left respectively.

It may be observed that these adjustments, within the conventional limits for adjusting the orientation of the optical axis of a headlamp, imply that the joints 48 and 49 are displaced with sufficiently small amplitude in order to ensure that the lines 50 and 51 remain at least approximately perpendicular to the plane 30 of the ground on which the vehicle stands and the longitudinal mid plane 6 of the vehicle respectively. These lines should also remain at least approximately parallel to the longitudinal mid plane 6 of the vehicle and to the plane 3 of the ground on which the vehicle stands respectively. Similarly, if the glass 15 performs an optical function in addition to that of the reflector 36, as is indeed the case when the reflector is paraboloid in shape, the amplitudes of the axis orientation adjusting displacements remain sufficiently small to ensure that the relative displacement which results between the position of the optical axis and the glass 15 has sufficiently small effect on the shape of the beam projected by the headlamp when in use and on the distribution of light within the beam for the beam to remain within the limits laid down by regulations.

Now that one example of a headlamp structure in accordance with the invention has been described, at least with respect to those features which are not already part of the state of the art, there follows a description of one example of how the method according to the invention may be performed on a headlamp having said structure.

The first step in performing the method consists in providing a headlamp having said structure.

Then, and preferably before mounting the headlamp in a motor vehicle (by fixing the assembly comprising the housing 27 and the glass 15 to the bodywork of the vehicle in the above-described manner), or optionally after mounting the said assembly on the vehicle, the headlamp 7 is associated with two reference planes 98 and 99 which are perpendicular to each other and which are located relative to the plane 20 as defined by the tangent plane to the three projections 17, 18 and 19 of the front face 14 of the glass 15, in orientations which are exactly identical to the orientations which the headlamp ought to occupy relative to the plane 3 of the ground on which the vehicle stands and relative to the longitudinal mid plane 6 of the vehicle, once the headlamp has been mounted on the vehicle. In other words, the aiming plane 21 as defined by co-operation with the fitting plate 16 should be exactly perpendicular to the planes 3 and 6. This initial setting up operation is performed by ensuring that the origins of the graduated scales 192 and 193 are kept in place in the corresponding windows 94 and 96 (e.g. by manual action on the corresponding knobs 90 and 91) while rotating the corresponding rods 62 and 63 relative to the sleeves 82 and 83 in order to bring the reflector 36 into such a position relative to the housing 27 that the optical axis 38 is exactly parallel to the reference planes 98 and 99. These two reference planes 98 and 99 are easily defined relative to the plane 20 of the projections 17, 18 and 19 or relative to the aiming plane 21 on an optical bench after switching on the lamp 35 fixed in the reflector 36 (with the lamp being switched on via the means 37 and occupying its in-service position for the optical bench be tests). Under these circumstances the orientation of the optical axis 38 relative to said reference planes 98 and 99 is easily monitored.

Once the optical axis has been properly adjusted by rotating the rods 62 and 63 relative to the sleeves 82 and 83, the rods may advantageously be locked in position relative to the sleeves by an appropriate means, e.g. by gluing, in order to ensure that any subsequent adjustment only rotates the sleeve relative to the wall rim with which it meshes and does not allow the rod to rotate relative to the sleeve. In this way, the appearance of the origin of each of the graduated scales 192 and 193 in the corresponding window 94 or 96 is guaranteed to represent a properly determined origin relative both to the plane 20 defined by the projections 17, 18 and 19 and also relative to the aiming plane 21 which is associated in a one-to-one manner to said plane 20 by the fitting plate 16. When any other graduated scale mark appears in the corresponding window 94 or 96 it is then directly representative of the angle by which the axis 38 is inclined relative to its original orientation, i.e. up and down or side to side depending on the adjustment means concerned. In mass production, the graduated scales 192 and 193 need only be set on an optical bench for the prototype headlamps of a given series, with the settings being reproduced on the subsequently manufactured lamps. Sample headlamps will naturally need verifying in conventional manner. In such a situation, the rods 62 and 63 may be fixed relative to the sleeves 82 and 83 respectively by automatic robots on the headlamp production lines.

The headlamp is then mounted on the vehicle by fixing the assembly comprising the housing 27 and the glass 15 to the vehicle bodywork using the parts 28, 29, 30 and 31 (unless the headlamp has already been fixed to the bodywork). The headlamp is fixed in such a manner as to ensure that the plane 20 defined by the projections 17, 18 and 19 is oriented as exactly as possible relative to the plane 3 on which the vehicle stands and the longitudinal mid plane 6 of the vehicle. In other words, the headlamp assembly is mounted to the bodywork in such a manner that the aiming plane 21 associated with the headlamp is as closely perpendicular as possible to both ends of said planes 3 and 6. Or put another way, the headlamp reference planes 98 and 99 are as close as possible to extending parallel to said planes 3 and 6.

Unfortunately, the normal manufacturing tolerances of vehicle bodywork and of assembling headlamps thereto means that in practice it is impossible to guarantee that these orientations are accurate enough. This is particularly true of the case where the physical shape of the bodywork and its points of attachment to the headlamp do not, on their own, completely define the orientation of the headlamp assembly relative to the plane 3 of the ground on which the vehicle stands and relative to the mid plane 6 of the vehicle. Other factors which have an effect on the orientation of the headlamp beam include the vehicle suspension, the state of inflation of the tires, and the load on the vehicle. Thus, both on initial manufacture and during subsequent verifications, it is necessary to be able to adjust the orientation of the headlamps in order to keep said orientation within legally allowable limits.

One way of performing such adjustments, as provided in American standard SAE J599 MAY81, for example, consists in reading any angular offset there may be between the real orientation of the optical axis 38 and planes which are accurately parallel to the plane 3 of the ground on which the vehicle stands and the longitudinal mid plane 6 of the vehicle from a test screen, and then acting appropriately on the knobs 90 and 91 to bring said beam orientation back into the legally allowed tolerances. Rotating the knobs 90 and 91 causes the reflector and lamp assembly of the corresponding headlamp to rotate about the lines 51 and 50 respectively. The effect of such rotation can be observed on the test screen and when it appears to be correct, the knobs can be left alone. This method of adjustment makes no use of the graduated scales 192 and 193, except insofar as the scales make it possible to return a headlamp to its original setting, and except insofar as the difference between the original setting and the final accurate setting gives an accurate measure of the adjustment that needed performing.

It is also possible to perform this adjustment by mechanical means 11 as defined, for example, in American standard SAE J602 OCT80 and as described, for example, in the above-mentioned U.S. patent.

In this case, the fitting plate 16 is fixed to the aiming apparatus 12 in releasable manner and the resulting assembly is fixed to the headlamp glass 15 by means of the suction cup 13 and with the projections 17, 18 and 19 being engaged so that the fitting plate 16 sets up an exact correspondence between the bearing plane 20 and an aiming plane 21. Any offset between the orientation of the aiming plane 21 and exact perpendicularity relative to the plane 3 of the ground on which the vehicle stands and the longitudinal mid plane 6 of the vehicle is representative of any corresponding offset or error in the orientation of the bearing plane 20 and hence of the reference planes 98 and 99 relative to said planes 3 and 6 respectively. If this adjustment process is performed during vehicle assembly, the optical axis 38 is accurately orientated relative to the reference planes and the graduated scales both have their origin marks 0 in their windows. If the adjustment is performed on a vehicle which is already in service, the optical axis 38 may be returned to its original setting by acting on the knobs 90 and 91 until the origin marks 0 appear in the corresponding windows.

If the only adjustment to be performed is between the optical axis 38 and the plane 3 of the ground on which the vehicle stands, the mechanical means 11 only need to be fitted to the headlamp whose orientation is to be adjusted. However, if adjustment is also to be performed relative to the longitudinal mid plane 6 of the vehicle, two sets of mechanical means 11 need mounting to the vehicle, one set on each headlamp. In other words, both headlamps 7 and 8 need to be simultaneously fitted with similar mechanical means 11.

In order to verify whether the optical axis 38 is parallel to the plane 3 of the ground on which the vehicle stands, and to correct any error therein, an initial measurement is performed in known manner of the angle between said ground plane 3 and the horizontal, and said angle is applied to the means 23 so that the horizontal position of the liquid level 22 corresponds to the optical axis 38 being parallel to the ground plane 3. Once this correction has been performed, the means 24 are used to bring the water level 22 into the horizontal position and the direction and magnitude of the angular offset is read directly from the means 24. In other words, the means 24 indicate the angle between a line 100 perpendicular to the aiming plane 21 and the reference parallel relative to the ground plane 3, i.e. the angle between the orientation of the aiming plane 21 and an orientation which is strictly perpendicular to the ground plane 3, or in other words, the angle between the real orientation of the bearing plane 20 and the predetermined orientation which it ought to have relative to the ground plane 3 to ensure that the aiming plane 21 is indeed perpendicular to said plane 3. This operation is known and is described, for example, in U.S. Pat. No. 2,997,914, in the passage running from column 6 line 67 to column 7 line 8. When referring to this passage in said document, any references to the optical axis or a the longitudinal axis of the headlamp should be changed to a reference to the direction 100, which directions are the same in headlamp structure for which the glass and the reflector constitute a fixed whole, as is the case for the headlamp described by the above-mentioned American patent, but is not the case in a headlamp of the structure of the present invention. If the reading from the means 24 indicates that the optical axis lies outside the legal limits, the drum 90 is rotated by hand together with the rod 62 fixed thereto inside the rim 74 in such a direction as to cancel the observed error, and until the window 94 displays the marking on the scale 192 which corresponds to the error read on the means 24. This corresponds to a given axial displacement of the rod 62 and to a consequent rotation of the reflector 36 and lamp 35 about the line 51 relative to the housing 27. This rotation is measured from the origin position and the displayed angle and the measured error angle are substantially equal so that the optical axis 38 ends up substantially parallel to the plane 3 of the ground on which the vehicle stands.

In order to verify whether the axis 38 is parallel to the longitudinal mid plane 6 of the vehicle, and to correct any error there may be in the orientation of the axis relative to said plane, the means 26 of the aiming apparatus 12 are operated so as to align the means 25 with analogous means on the aiming apparatus associated with the other headlamp, and in a direction perpendicular to the longitudinal mid plane 6 of the vehicle. A reading taken from the means 26 indicates the direction and the value of the error angle between the direction 100 and being accurately parallel to the longitudinal mid plane 6, as described at lines 11 to 22 of column 7 of American U.S. Pat. No. 2,997,914. References to the optical axis or to the longitudinal headlamp axis should be replaced by references to the direction 100, as explained above.

If the reading taken from the means 26 shows that the direction 100 is at an angle relative to the longitudinal mid plane 6 which lies outside the legal limits (which error angle is representative of an error in the orientation of the aiming plane 21 relative to exact perpendicularity with the plane 6, or else to an error between the orientation of the mounting plane 20 relative to the plane 6 and the orientation of said plane 20 relative to the reference plane 99, or else to an error in the original orientation of the axis 38 relative to exact parallelism with the longitudinal mid plane 6) the desired parallelism between the axis 38 and the plane 6 is reestablished by acting on the knob 91. This knob is rotated, causing the rod 63 to rotate in the appropriate direction until the graduation appearing in the window 96 corresponds to the error read from the means 26. Rotating the rod 63 causes the rod 63 to be displaced axially relative to the housing 27, thereby pivoting the reflector 36 and the lamp 35 relative to the housing 27 and about the line 50 with an appropriate angular amplitude to return the axis 38 into an orientation which is parallel with the plane 6.

The mechanical adjustment means such as 11 can then be removed from the headlamps.

Once the orientation of the optical axis 38 has been adjusted, both up and down and side to side, the optical axis 38 occupies a predetermined orientation 9 relative to the plane 3 of the ground on which the vehicle stands and relative to the longitudinal mid plane 6 of the vehicle, i.e. in the example above the optical axis is parallel to both of said planes. The person skilled in the art will understand that being parallel to the planes 3 and 6 is merely an example of a predetermined orientation to which the optical axis 38 may be set relative to said planes 3 and 6, and the above description is easily extrapolated to any other given predetermined orientation for the optical axis 38 relative to the ground plane 3 and the mid plane 6. This can be done by ensuring that the displayed graduated scale in the windows 94 and 96 corresponds with the required predetermined orientation of the optical axis 38 relative to the reference planes 98 and 99 respectively, with the reference planes 98 and 99 being defined as before with reference to the plane 20, or preferably, by being perpendicular to the aiming plane 21 which is associated in a one-to-one fashion with the plane 20 by the fitting plate 16 for use in conjunction with the headlamp for mechanically verifying its orientation by means such as 11. The original orientation of the optical axis 38 and the direction 100 are then different, but they nevertheless remain associated in a one-to-one manner such that:

any angular error between the direction 100 and exact parallelism relative to the ground plane 3 is representative of a difference between the angular orientations of the axis 38 relative to the ground plane 3 and relative to the reference plane 28 respectively, with the origin of the graduated scale 192 appearing in the window 94, and a correction can be applied by rotating the knob 90 until the measured error appears in the window 94 as explained above; and similarly, any angular error between the direction 100 and a direction which is exactly parallel to the longitudinal mid plane 6 of the vehicle is representative of a difference between the orientation of the axis 38 relative to the longitudinal mid plane 6 of the vehicle and relative to the reference plane 99 respectively, with the origin of the graduated scale 193 being in the window 96. The appropriate correction can then be applied by rotating the knob 91 until the scale 193 displays a graduation in said window 96 corresponding to the measured error, as described above.

Naturally, the invention has been described with reference to the most usual case where it is desired to adjust the orientation of the optical axis of a headlamp with reference to the plane 3 of the ground on which the vehicle stands and with reference to the longitudinal mid plane 6 of the vehicle. The method of the invention could equally well be applied to a case where only one of said adjustments is to be performed, since it can be seen that the adjustments are independent of each other. For example, the structure illustrated in FIG. 9 could be replaced by a fixed structure in which the rod 63 would not be movable relative to the housing 27, thereby fixing the joint 49 in the saxe way as the joint 47 is fixed relative to said housing 27 in a position such that the line 51 is placed at least approximately parallel to the plane 3 of the ground on which the vehicle stands and at least approximately perpendicularly to the longitudinal mid plane 6 of the vehicle, while leaving the means illustrated in FIG. 5 as shown in order to enable the position of the joint 48 to be adjusted relative to the housing 27. With such equipment the above-described method steps relating to orienting the optical axis 38 relative to the ground plane 3 may be performed. Similarly, the structure illustrated in FIG. 9 could be retained allowing the position of the joint 49 relative to the housing 27 to be adjusted, while the structure illustrated in FIG. 5 could be replaced by a fixed structure in which the rod 62 is not movable relative to the housing 27 such that the line 50 is placed at least approximately parallel to the longitudinal mid plane 6 of the vehicle and at least approximately perpendicular to the plane 3 of the ground on which the vehicle stands. Such equipment would enable the method steps relating to adjusting the orientation of the optical axis 38 relative to the longitudinal mid plane 6 of the vehicle to be performed.

Further, if the term "optical assembly" is used to designate the reflector 36 and the lamp 35 as movably mounted inside the housing 27 in order to enable its optical axis 38 to be adjusted in orientation relative to two mutually perpendicular planes, or relative to just one of said planes, it may be observed that said "optical assembly" may be replaced by various kinds of completely different optical assembly, which may or may not require the glass 5 to perform an optical function, and without going beyond the method of the invention.

Figure 12:
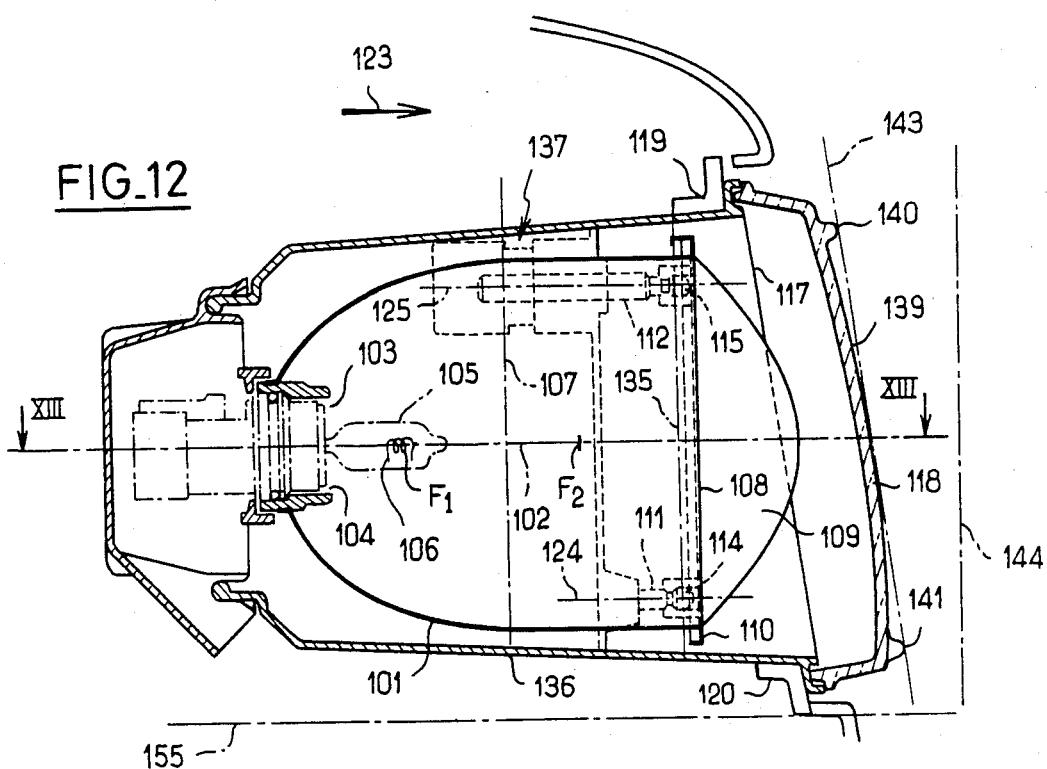
FIGS. 12 and 13 are section views respectively analogous to FIGS. 4 and 8 on planes marked XII—XII in FIG. 13 and XIII—XIII in FIG. 12 through a projector including an elliptical reflector.
Figure 13:
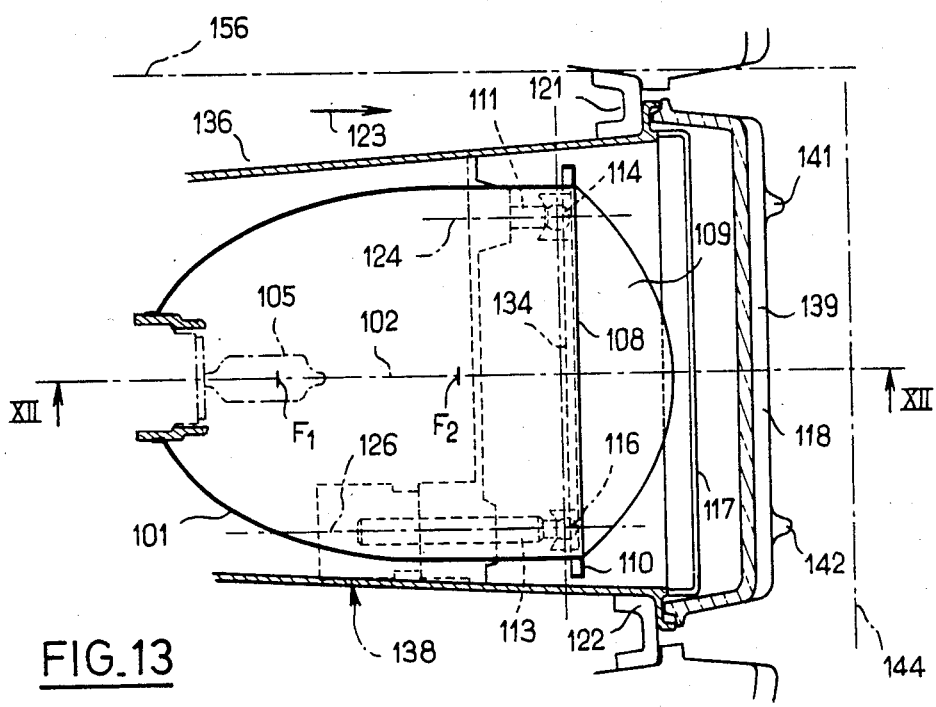

Thus, FIG. 12 and 13 show a headlamp in which said "optical assembly" is constituted by a reflector 101 which is ellipsoidal in shape and symmetrical about an axis 102 which defines an optical axis. On this axis, the reflector has two focuses $F_1$ and $F_2$. At the $F_1$ end the reflector has an orifice 103 for receiving means 104 analogous to the above-described means 37 for holding an incandescent lamp 105 inside the reflector 101 in such a position that the filament 106 of the lamp 105 is located at the focus $F_1$ or in the immediate vicinity thereof. The reflector 101 is ellipsoidal in shape about the axis 102 from the edges of the orifice 103 up to an intersection with a plane 107 which is perpendicular to the axis 102 and which intersects said axis half-way between the focuses $F_1$ and $F_2$. Thereafter the reflector extends cylindrically from the plane 107 away from the focus $F_1$ up to a light projection face 108 which is disposed perpendicularly to the axis 102 and on the other side of the focus $F_2$. The projection face 108 of the reflector is unimpeded, and is closed by a converging lens 109 which is fixed to the reflector 101 in such a position that the optical axis of the lens coincides with the optical axis 102 of the reflector and one of the focuses of the lens coincides with the focus $F_2$. The projection face 101 has an outwardly directed peripheral rim 110 on which three ball joints 114, 115 and 116 at the corners of a right-angle triangle are disposed outside the reflector 101. The triangle lies in a plane perpendicular to the optical axis 102 and three rod 111, 112 and 113 which are entirely comparable to the rods 61, 62 and 63 are associated with said ball joints. The ball-and-socket arrangements of the ball joints are likewise entirely comparable to those described with reference to FIGS. 4 to 11.

The other ends of the rods 111 to 113 are mounted in inside a housing 136 in an entirely analogous way to the way in which the rods 61 to 63 are mounted inside the housing 27. Similarly, the housing 136 is intended to be fixed to the bodywork of the vehicle. The housing 136 has an open face 117 for pointing forwardly when the headlamp is mounted on the vehicle, and the face 117 is covered by a glass 118 which is fixed around its periphery to the housing 136. Inside the housing, the light projection face 108 of the reflector 101 and the lens 109 are turned towards the glass 118, and the optical axis 102 passes through said glass.

Taking the projector mounted on a vehicle by the housing 136 being fixed to bodywork components 119, 120, 121, 122 as described above with reference to the example of FIGS. 4 to 11, and taking the direction of forward motion of the vehicle to be given by arrow 123, the rods 111, 112 and 113 extend backwardly from the rim 110 to which they articulated by the respective ball joints 114, 114 and 116 at their front ends. They extend backwardly from said ball joints along respective axes 124, 125, 126 which are mutually parallel and whose orientations are defined by the rods being engaged at their rear ends with the housing 136 in a position such that the optical axis 102 is at least approximately parallel to said axes and that the joint 114 at the right angle and the joint 116 define a line 134 extending beneath the axis 102 which is intended to be placed at least approximately parallel to the plane of the ground on which the vehicle stands and at least approximately perpendicular to the longitudinal mid plane of the vehicle, and that the joints 114 and 115 together define a line 135 which is at least approximately perpendicular to the line 134 and which is intended to be placed at least approximately parallel to the longitudinal mid plane of the vehicle between said mid plane and the optical axis, and at least approximately perpendicularly to the plane of the ground on which the vehicle stands. Unlike the joints 114 and 116 which are situated beneath the optical axis 102, the joint 115 is situated above the optical axis, when the headlamp is mounted on a vehicle.

Figure 5:
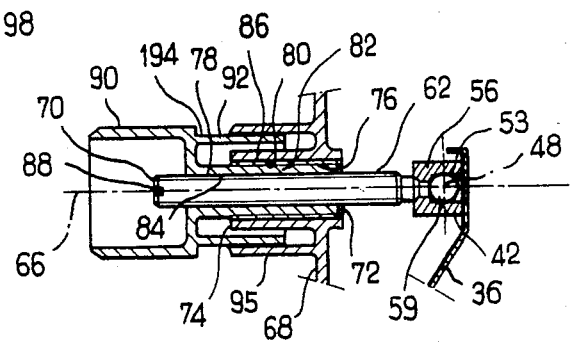
FIG. 5 is a section on a plane designated V—V in FIG. 4 showing means for adjusting the up and down orientation of the headlamp, i.e. the angular orientation of the optical axis relative to the plane of the ground on which the vehicle stands.
Figure 6:
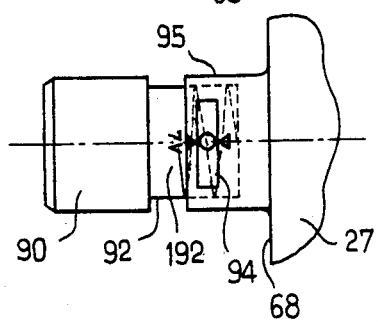
FIG. 6 is a plan view of the FIG. 5 means seen looking along arrow VI of FIG. 4.

Towards the rear of the rod 111 associated with the joint 114 and corresponding to the right angle of the triangle defined by the joints 114, 116 and 116, the rod 111 is fixed to the housing 136, whereas the other two rods 112 and 113 which are respectively associated with the joints 115 and 116 pass through respective wall portions of the housing 136 and extend outside said housing, are connected thereto by respective adjustment means 137 and 138 which are entirely similar to the means described with reference to FIGS. 5 to 7 and with the means described with reference to FIGS. 9 to 11 respectively. In other words, the adjustment means 137 include components corresponding to the means 74, 76, 78, 80, 82, 84, 86, 88, 90, 92, 94, 95, 192 and 194, whereas the adjustment means 138 include means corresponding to the means 75, 77, 79, 81, 83, 85, 87, 89, 91, 93, 96, 97, 193 and 195. No further description is therefore given of these adjustment means 137 and 138, since reference to the earlier passages gives a complete description thereof. The outside face 139 of the glass 118, i.e. the front face thereof has three tabs or projections 140, 141 and 142 fixed thereon in a manner entirely analogous to the projections 17, 18, 19. In other words, these projections are in a triangular configuration to define a bearing plane 143 which is tangential to the set of tabs or projections when engaged with a fixing plate such as the plate 16 of aiming apparatus such as 12 in means such as 11. In other words, the fixing plate provides a one-to-one correspondence between the bearing plane 143 and an aiming plane 144 which has the same function as the aiming plane 21 described with reference bo the embodiment of FIGS. 4 to 11.

It will readily be understood that using reference planes 155 and 156 defined relative to the components of the headlamp illustrated in FIGS. 12 and 13 in the same manner as defined for the reference planes 98 and 99 for the headlamp illustrated in FIGS. 4 to 11, and by using these reference planes in the same manner relative to the bearing plane 143, the aiming plane 114, and the means 137 and 138 as described above with reference to the embodiment of FIGS. 4 to 11, it is possible to adjust the orientation of the optical axis 102 relative to the plane of the ground on which the vehicle stands and/or relative to the longitudinal mid plane of the vehicle under the same conditions as described above. The steps of the method are just the same.

Naturally, the implementations of the method according to the invention and the embodiments of a headlamp in accordance with the invention as described are merely non-limiting examples, and numerous variants could be provided without going beyond the scope of the invention. These variants could relate to the optical assembly, to the housing and glass assembly, to the graduated adjustment means for adjusting the relative positions of these two assemblies in order to adjust the orientation of the optical axis, or else to the way in which the bearing plane for use in conjunction with the mechanical adjustment means is defined on the headlamp glass together with the associated aiming plane which is related thereto in a one-to-one manner. These items may well change with changing regulations. In particular, a plurality of optical assemblies could be associated with a single glass within the scope of the present invention, for example a single glass could be associated with a main beam optical assembly and with a dipped beam optical assembly. Each of these assemblies could be positioned relative to the glass by its own graduated adjustment means of the type described above or of an equivalent type, thereby enabling the optical axes of said optical assemblies to be independently adjusted relative to a plane defined by the vehicle or relative to two such planes, using the method described above. A single plane related to the glass could be used for both sets of optical adjustments.

It should be observed that using a bearing plane 20 or 143 between a fixing plate of the mechanical adjustment means for adjusting the orientation of a motor vehicle headlamp when defining the reference planes 98, 99, 155; 156 on the basis of which the graduated scales such as 192 and 193 are set, makes it possible to take account automatically of the geometrical tolerances inherent in manufacturing and assembling the various parts of the headlamp, and in particular the tabs or projections 17, 18, 19, 140, 141 and 142 and the tolerances in assembling the glass 15, 118 to the housing 27, 136 are automatically taken into account, thereby making it possible to permit any machining operation on the projections which may be left in their raw state from the original moulding.

I claim:

1. A method of adjusting the orientation of a motor vehicle headlamp of the type comprising a transparent glass fixed to bodywork of a vehicle wherein the following steps are performed to place the headlamp's optical axis in a first predetermined orientation relative to a plane which is fixed relative to said vehicle;

(1) providing a headlamp comprising:
transparent glass adapted to be fixed to a vehicle;
an optical assembly having an optical axis adapted to pass through said glass;
means defining a plane which is fixed relative to said glass and which, when said glass is fixedly mounted to said vehicle bodywork, occupies an orientation which at least approximately coincides with a second predetermined orientation relative to said plane which is fixed relative to said vehicle; and
means for connecting said optical assembly to said glass comprising both guide pivot means for guiding said optical assembly to pivot relative to said glass about a pivot axis which, when mounted, is at least approximately parallel to said plane which is fixed relative to said vehicle; and
graduated adjustment means for adjusting the position of said optical assembly relative to said glass by pivoting about said pivot axis;

(2) positioning a reference plane relative to said headlamp, said reference plane being fixed relative to said glass in such a manner that said plane which is fixed relative to said glass occupies said second predetermined orientation relative to said reference plane and that said pivot axis is at least approximately parallel to said reference plane, then acting on said graduated adjustment means to pivot said optical assembly relative to said glass about said pivot axis until said optical axis occupies said first predetermined orientation relative to said reference plane, and setting the graduation of said graduated adjustment means to have an origin corresponding to said relative position and to indicate the angular orientation of said optical axis relative to said reference plane and from said origin; and
mounting said headlamp on said vehicle and fixing said glass to said vehicle bodywork in such manner that said plane which is fixed relative to said glass is positioned as close as possible to said second predetermined orientation; and (3) measuring such angular offset as there may be between the mounted orientation and said second predetermined orientation and pivoting said optical axis through an angle as marked by said graduation equal to said measured offset and in such direction as to bring said optical axis into said first predetermined orientation.

2. A method of adjusting the orientation of a motor vehicle headlamp of the type comprising a transparent glass fixed to bodywork of a vehicle wherein the following steps are performed to place the headlamp's optical axis in a first predetermined orientation parallel to the plane of the ground on which the vehicle stands;

(1) providing a headlamp comprising:
transparent glass adapted to be fixed to a vehicle;
an optical assembly having an optical axis adapted to pass through said glass;
means defining a plane which is fixed relative to said glass and which, when said glass is fixedly mounted to said vehicle bodywork, occupies an orientation which at least approximately coincides with a second predetermined orientation relative to said plane of the ground on which said vehicle stands; and
means for connecting said optical assembly to said glass comprising both guide pivot means for guiding said optical assembly to pivot relative to said glass about a pivot axis which, when mounted, is at least approximately parallel to said plane of the ground on which said vehicle stands; and
graduated adjustment means for adjusting the position of said optical assembly relative to said glass by pivoting about said pivot axis;

(2) positioning a reference plane relative to said headlamp, said reference plane being fixed relative to said glass in such a manner that said plane which is fixed relative to said glass occupies said second predetermined orientation relative to said reference plane and that said pivot axis is at least approximately parallel to said reference plane, then acting on said graduated adjustment means to pivot said optical assembly relative to said glass about said pivot axis until said optical axis is parallel to said reference plane, and setting the graduations of said graduated adjustment means to have an origin corresponding to said relative position and to indicate the angular orientation of said optical axis relative to said reference plane and from said origin; and mounting said headlamp on said vehicle and fixing and glass to said vehicle bodywork in such manner that said plane which is fixed relative to said glass is positioned as close as possible to said second predetermined orientation; and (3) measuring such angular offset as there may be between the mounted orientation and said second predetermined orientation and pivoting said optical axis through an angle as marked by said graduations equal to said measured offset and in such direction as to bring said optical axis into said first predetermined orientation parallel to said plane of the ground on which said vehicle stands.

3. A method of adjusting the orientation of a motor vehicle headlamp of the type comprising a transparent glass fixed to bodywork of a vehicle wherein the following steps are performed to place the headlamp's optical axis in a first predetermined orientation parallel to a longitudinal mid plane of said vehicle;

(1) providing a headlamp comprising:
transparent glass adapted to be fixed to a vehicle;
an optical assembly having an optical axis adapted to pass through said glass;
means defining a plane which is fixed relative to said glass and which, when said glass is fixedly mounted to said vehicle bodywork, occupies an orientation which at least approximately coincides with a second predetermined orientation relative to said longitudinal mid plane of said vehicle; and
means for connecting said optical assembly to said glass comprising both guide pivot means for guiding said optical assembly to pivot relative to said glass about a pivot axis which, when mounted, is at least approximately parallel to said longitudinal mid plane of said vehicle; and
graduated adjustment means for adjusting the position of said optical assembly relative to said glass by pivoting about said pivot axis;

(2) positioning a reference plane relative to said headlamp, said reference plane being fixed relative to said glass in such a manner that said plane which is fixed relative to said glass occupies said second predetermined orientation relative to said reference and that said pivot axis is at least approximately parallel to said refernece plane, then acting on said graduated adjustment means to pivot said optical assembly relative to said glass about said pivot axis until said optical axis is parallel to said reference plane, and setting the graduations of said graduated adjustment means to have an origin corresponding to said relative position and to indicate the angular orientation of said optical axis relative to said reference plane and from said origin; and mounting said headlamp on said vehicle and fixing said glass to said vehicle bodywork in such manner that said plane which is fixed relative to said glass is positioned as close as possible to said second predetermined orientation; and (3) measuring such angular offset as there may be between the mounted orientation and said second predetermined orientation and pivoting said optical axis through an angle as marked by said graduations equal to said measured offset and in such direction as to bring said optical axis into said first predetermined orientation parallel to said longitudinal mid plane of said vehicle.

4. A method of adjusting the orientation of a motor vehicle headlamp of the type comprising a transparent glass fixed to bodywork of a vehicle wherein the following steps are performed to place the headlamp's optical axis in a first predetermined orientation relative to a first plane and along a second predetermined orientation relative to a second plane, said first and second planes being fixed relative to said vehicle and being at least approximately perpendicular to each other;

(1) providing a headlamp comprising:
transparent glass adapted to be fixed to a vehicle;
an optical assembly having an optical axis adapted to pass through said glass;
means defining a plane which is fixed relative to said glass and which, when said glass is fixedly mounted to said vehicle bodywork, occupies an orientation which at least approximately coincides with a third predetermined orientation relative to said first plane which is fixed relative to said vehicle and with a fourth predetermined orientation relative to said second plane which is fixed relative to said vehicle; and
means for connecting said optical assembly to said glass comprising guide pivot means for guiding said optical assembly to pivot relative to said glass about a first pivot axis which, when mounted, is at least approximately perpendicular to said second plane which is fixed relative to said vehicle and about a second pivot axis which, when mounted, is at least approximately perpendicular to said first plane which is fixed relative to said vehicle; and
first graduated adjustment means for adjusting the position of said optical assembly relative to said glass by pivoting about said first pivot axis and second graduated adjustment means for adjusting the position of said optical assembly relative to said glass by pivoting about said second pivot axis;

(2) positioning first and second mutually perpendicular reference planes relative to said headlamp, said reference planes being fixed relative to said glass in such a manner that said plane which is fixed relative to said glass occupies said third and fourth predetermined orientations relative to said first and second reference planes respectively and that said first and second pivot axes are at least approximately perpendicular to said second and first reference planes respectively, then acting on said first and second graduated adjustment means to pivot said optical assembly relative to said glass about said first and second pivot axes respectively until said optical axis occupies said first and second predetermined orientations relative to said first and second reference planes, and setting the graduations of said first and second graduated adjustment means to have their origins correspond to said relative position and to indicate the angular orientations of said optical axis relative to said first and second reference planes and from said origin; and mounting said headlamp on said vehicle and fixing said glass to said vehicle bodywork in such manner that said plane which is fixed relative to said glass is positioned as close as possible to said third and fourth predetermined orientations; and (3) measuring such first and second angular offsets as there may be between the mounted orientation and said third and fourth predetermined orientations respectively, and pivoting said optical axis through an angle as marked by said graduations equal to said measured offset(s) and in such direction as to bring said optical axis into said first and second predetermined orientations.

5. A method of adjusting the orientation of a motor vehicle headlamp of the type comprising a transparent glass fixed to bodywork of a vehicle wherein the following steps are performed to place the headlamp's optical axis in an orientation which is parallel to the plane of the ground on which the vehicle stands and to the longitudinal mid plane of the vehicle;

(1) providing a headlamp further comprising:

means defining a plane which is fixed relative to said glass and which when said glass is fixedly mounted to said bodywork, occupies an orientation which at least approximately coincides with a first predetermined orientation relative to said plane of the ground on which said vehicle stands and with a second predetermined orientation relative to said longitudinal mid plane of said vehicle; and means for connecting said optical assembly to said glass comprising: guide pivot means for guiding said optical assembly to pivot relative to said glass about a first pivot axis which, when mounted, is at least approximately perpendicular to said longitudinal mid plane of said vehicle and about a second pivot axis which, when mounted is at least approximately perpendicular to said plane of the ground on which said vehicle stands; first graduated adjustment means for adjusting the position of said optical assembly relative to said glass by pivoting about said first pivot axis; and second graduated adjustment means for adjusting the position of said optical assembly relative to said glass by pivoting about said second pivot axis;

(2) positioning first and second mutually perpendicular reference planes relative to said headlamp, said reference planes being fixed relative to said glass in such a manner that said plane which is fixed relative to said glass occupies said first and second predetermined orientations relative to said first and second reference planes respectively and that said first and second pivot axes are at least approximately perpendicular to said second and first reference planes respectively, then acting on said first and second graduated adjustment means to pivot said optical assembly relative to said glass about said first and second pivot axes respectively until said optical axis occupies said first and second predetermined orientations relative to said first and second reference planes, and setting the graduations of said first and second graduated adjustment means to have their origins corresponding to said relative position and to indicate the angular orientations of said optical axis relative to said first and second reference planes and from said origin; and mounting said headlamp on said vehicle and fixing said glass to said vehicle bodywork in such manner that said plane which is fixed relative to said glass is positioned as close as possible to said first and second predetermined orientations; and (3) measuring such first and second angular offsets as there may be between the mounted orientation and said first and second predetermined orientations respectively and pivoting said optical axis through an angle as marked by said graduations equal to said measured offset(s) and in such a direction as to bring said optical axis into an orientation parallel to said plane on which said vehicle stands and also to said longitudinal mid plane of said vehicle.

* * * * *